US011985967B1

(12) United States Patent
Harris

(10) Patent No.: US 11,985,967 B1
(45) Date of Patent: May 21, 2024

(54) LIGHT-EMITTING DIODE (LED) LAMP FOR BUG DETERRENCE

(71) Applicant: Geoffrey Herbert Harris, Chicago, IL (US)

(72) Inventor: Geoffrey Herbert Harris, Chicago, IL (US)

(73) Assignee: Geoffrey Herbert Harris, Chicago, IL (US)

( * ) Notice: Subject to any disclaimer, the term of this patent is extended or adjusted under 35 U.S.C. 154(b) by 0 days.

(21) Appl. No.: 18/130,479

(22) Filed: Apr. 4, 2023

(51) Int. Cl.
| *A01M 29/10* | (2011.01) |
| *F21L 4/08* | (2006.01) |
| *F21S 6/00* | (2006.01) |
| *F21V 17/08* | (2006.01) |
| *F21Y 115/10* | (2016.01) |
| *H05B 45/10* | (2020.01) |
| *H05B 45/20* | (2020.01) |

(52) U.S. Cl.
CPC .............. *A01M 29/10* (2013.01); *F21L 4/08* (2013.01); *F21S 6/002* (2013.01); *H05B 45/10* (2020.01); *H05B 45/20* (2020.01); *A01M 2200/01* (2013.01); *F21V 17/08* (2013.01); *F21Y 2115/10* (2016.08)

(58) Field of Classification Search
CPC ... A01M 29/10; A01M 2200/01; H05B 45/20; H05B 45/10; F21L 4/08; F21S 6/002; F21Y 2115/10; F21V 17/08
See application file for complete search history.

(56) References Cited

U.S. PATENT DOCUMENTS

| 5,105,344 A | * | 4/1992 | Sapp | A01M 1/04 362/180 |
| D878,664 S | * | 3/2020 | De Majo | D26/93 |
| 2010/0226122 A1 | * | 9/2010 | Tsai | A01M 29/10 362/231 |

FOREIGN PATENT DOCUMENTS

| CN | 102937271 A | * | 2/2013 | |
| CN | 106287287 A | * | 1/2017 | |
| CN | 107435899 A | * | 12/2017 | |
| CN | 110056811 A | * | 7/2019 | |
| JP | 2003284482 A | * | 10/2003 | |
| WO | WO-2009105168 A2 | * | 8/2009 | ............... F21S 2/00 |

OTHER PUBLICATIONS

Krishna, Priya, "The Lamp That's Taking Over New York," The New York Times, Aug. 11, 2022, https://www.nytimes.com/2022/08/11/dining/table-lamp-nyc-restaurants.html.

* cited by examiner

*Primary Examiner* — Mary Ellen Bowman
(74) *Attorney, Agent, or Firm* — Banner & Witcoff, Ltd.

(57) ABSTRACT

Apparatus and systems for a self-contained and portable LED lamp, providing bug deterrent capabilities and a limited number of ambient light settings, are described herein. A battery may be electrically coupled to a LED and configured to produce power. The LED may include lighting chip controls, which may cause the LED to emit light corresponding to one or more of: ambient white light or an insect deterrence light, where light emission of the LED is limited to: a maximum of three ambient white light settings, and one or more insect deterrence settings. A switch may be configured to transition between the maximum of three ambient white light settings and the one or more insect deterrence settings.

20 Claims, 8 Drawing Sheets

LIGHT-EMITTING DIODE (LED) LAMP FOR BUG DETERRENCE

TECHNICAL FIELD

Aspects described herein generally related to light-emitting diode (LED) light sets. More specifically, aspects relate to a lamp with multiple ambient light settings, including a setting for bug deterrence.

BACKGROUND

The use of table lamps with multiple light settings is conventional. However, in most instances, such lamps may include a plurality of settings that may be distasteful and/or otherwise disruptive, thereby affecting an ambiance of a setting in which the lamp is located (e.g., a neon lamp may be disruptive in an otherwise dimly lit restaurant setting). Furthermore, individuals may be bothered by the prevalence of bugs or other insects in various outdoor settings. In such settings, the portability and/or self-containment of the lamp may be important (e.g., so as to provide flexibility in location and minimize inconvenience, such as allowing movement of a lamp from one table to another without the disruption of a hardwire connection to a power source). Accordingly, there exists a need for a portable and self-contained lamp that deters such bugs without causing disruptions to nearby surroundings.

SUMMARY OF THE INVENTION

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed to portable and self-contained apparatuses and systems that emit a limited number of ambient light settings and provide insect deterrent capabilities.

One or more aspects described herein provide an insect deterrent lamp that includes a battery electrically coupled to a light-emitting diode (LED) and configured to produce power. The LED may include lighting chip controls, which may cause the LED to emit light corresponding to one or more of: ambient white light or an insect deterrence light, and where light emission of the LED may be limited to: a maximum of three ambient white light settings, and one or more insect deterrence settings. The insect deterrent lamp may also include a switch configured to transition between the maximum of three ambient white light settings and the one or more insect deterrence settings.

In one or more instances, the lighting chip controls may include one or more LED chips configured to emit the maximum of three ambient white light settings and the one or more insect deterrence settings. In one or more instances, emitting the ambient white light may include emitting a first wavelength within a range of 400-700 nanometers.

In one or more examples, the LED may use multiple LED chips to output different wavelengths within the range of 400-700 nanometers, and a combination of the first wavelength and the different wavelengths may create the ambient white light. In one or more examples, emitting the insect deterrent light may include emitting a second wavelength corresponding to a color to which insects are not attracted or from which the insects are deterred.

In one or more instances, the second wavelength may be within a range of 585-620 nanometers, and the one or more insect deterrence settings may be an ambient orange light. In one or more instances, the second wavelength may be within a range of 570-585, and the one or more insect deterrence settings may be an ambient yellow light.

In one or more examples, the LED is configured to output different wavelengths in addition to the second wavelength, and a combination of the second wavelength and the different wavelengths may create an ambient pink light, where the insect deterrence setting comprises the ambient pink light. In one or more examples, the switch may be configured to modify output of the LED to a different intensity of the ambient white light, and the LED may be configured to output a maximum of three intensities of the ambient white light, each corresponding to one of the maximum of three ambient light settings.

In one or more examples, the insect deterrence lamp may include a connector connected to the battery enabling the battery to be charged by a uniform serial bus (USB) connection. In one or more examples, the insect deterrence lamp may include a shade, a base, and a support, where the support is configured to connect the shade to the base.

In one or more instances, the battery, the LED, and the switch may be configured within the shade, and the shade may be configured for operation without the base and the support. In one or more instances, the shade may include a hook mechanism, configuring the shade to be hung using the hook mechanism In one or more examples, the support may include a height adjustment mechanism, which may configure a height of the insect deterrence lamp to vary between 10 inches and 13.5 inches. In one or more examples, the LED may be configured to switch between the maximum of three ambient white light settings and the one or more insect deterrence settings in response to a control signal from a mobile application. In one or more instances, the LED may be configured to switch between the maximum of three ambient white light settings and the one or more insect deterrence settings in response to a manual input received at the insect deterrence lamp.

One or more additional or alternative embodiments described herein include an insect deterrent lamp that includes a battery electrically coupled to at least one light emitting diode (LED) and configured to produce power. The LED may include lighting chip controls, configured to emit light in a plurality of settings, limited to: a maximum of three ambient white light settings, and a one or more insect deterrence light settings. The insect deterrent lamp may also include a switch connected to the at least one LED, where the switch is configured toggle between the plurality of settings.

In one or more instances, a first white light setting of the maximum of three ambient white light settings may correspond to emission of a plurality of wavelengths within a range of 400-700 nanometers corresponding to a first intensity of ambient white light. A second white light setting of the maximum of three ambient white light settings may correspond to emission of the plurality of wavelengths within the range of 400-700 nanometers corresponding to a second intensity of ambient white light, where the second intensity is less than the first intensity, and where initiating the second white light setting may include increasing a resistance between the battery and the lighting chip controls using a variable resistance component.

In one or more examples, the maximum of three ambient white light settings may be emitted by a first LED, the one or more insect deterrence light settings may be emitted by a second LED, and the one or more insect deterrence light settings may be emission of one of: orange light, pink light, or yellow light.

One or more additional or alternative embodiments described herein include a self-contained and portable light-emitting diode (LED) device, which may include a base, an extendable support apparatus, and a shade. The shade may include one or more LEDs configured to toggle between four or less light settings, which may include one or more of: a first ambient white light setting, a second ambient white light setting, or a third ambient white light setting, where the second ambient white light setting has a higher intensity that the first ambient white light setting, and the third ambient white light setting has a higher intensity than the second ambient white light setting. The four or less light settings may also include one or more insect deterrent settings corresponding to one or more of: an ambient orange light, an ambient yellow light, or an ambient pink light. The LED device may further include a battery, where the one or more LEDs are powered exclusively by the battery, and where the battery may configure the one or more LEDs for operation in the absence of a hardware connection to a separate power source.

BRIEF DESCRIPTION OF DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed to apparatuses and systems that emit a limited number of ambient light settings for bug deterrence.

In the following description of the various embodiments, reference is made to the accompanying drawings, which illustrate various embodiments in which aspects described herein may be practiced. It is to be understood that other embodiments may be utilized and structural and functional modifications may be made without departing from the scope of the described aspects and embodiments. Aspects described herein are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Figure 1A:
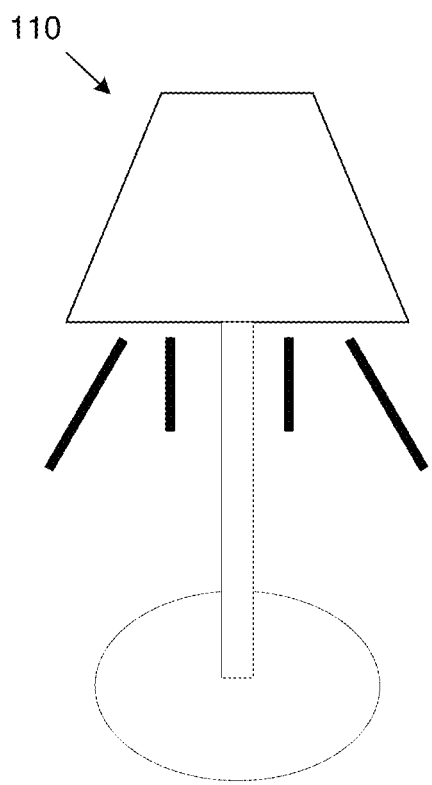
FIGS. 1A-1B are diagram illustrating a bug deterrent lamp and an LED that may be used to implement aspects of the disclosure.

FIG. 1A illustrates a bug deterrent lamp 110 that may be described further herein according to one or more aspects of the disclosure. For example, as described further herein, the bug deterrent lamp may be a self-contained and portable LED lamp with variable light settings. For example, the bug deterrent lamp 110 may be limited to a maximum of four discrete light settings. In doing so, the bug deterrent lamp 110 may prevent the emission of light that may disturb an ambiance of a location in which the bug deterrent lamp 110 is located (e.g., such as a dimly lit restaurant, or the like). For example, a maximum of three of the discrete light settings may be directed to warm white ambient light settings (e.g., low, medium, high). Additionally, exactly one setting may be directed to an ambient color known to either deter and/or otherwise not attract insects (e.g., orange, yellow, pink, and/or other colors known to be a bug deterrent). In doing so, the bug deterrent lamp 110 may provide bug deterrent capabilities without disrupting the above described ambience. By providing charging and/or other battery powered capabilities, the bug deterrent lamp 110 may be self-contained and portable, thus eliminating a need to maintain a wired connection between the LED lamp and a power outlet during use. The bug deterrent lamp 110 may be configured with height adjustment capabilities, as well as a hook enabling the bug deterrent lamp to be hung. Additionally, materials used to construct the bug deterrent lamp 110 may configure the bug deterrent lamp 110 for both indoor and outdoor use. In order to produce the four discrete light settings described above, the bug deterrent lamp 110 may include one or more LEDs, such as the LED 100, which is described further below with regard to FIG. 1B.

Figure 1B:
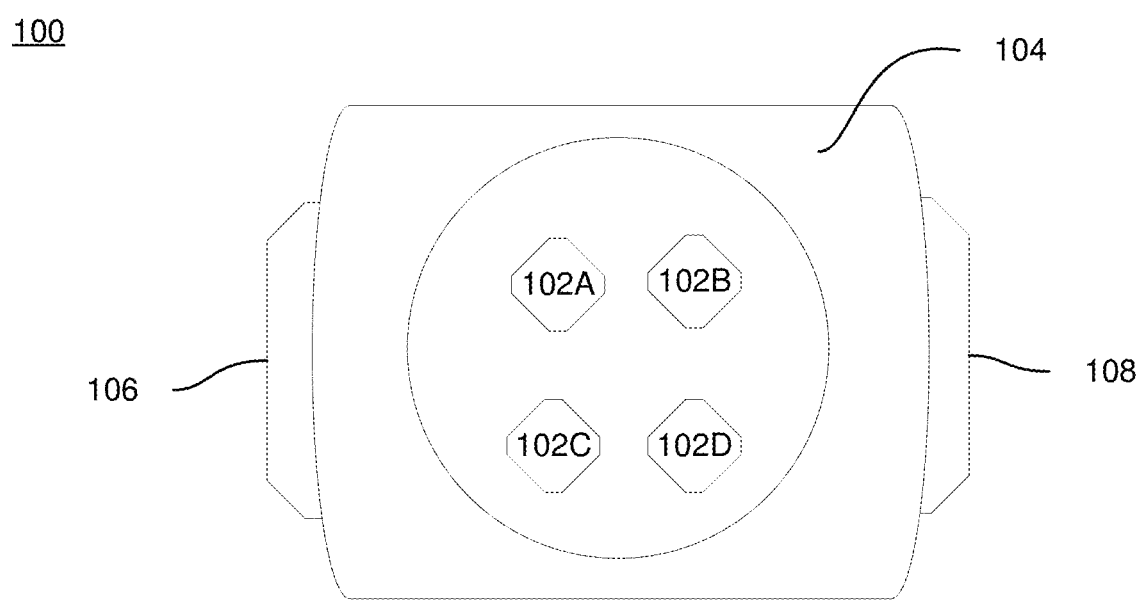

Referring to FIG. 1B, FIG. 1B illustrates an LED 100 that may be used according to one or more illustrative embodiments of the disclosure. LED 100 may be a miniature, low-current, low-power, standard, ultra-high-output, high-power, AC driven, flashing, bi-color, tri-color, decorativemulticolor, or filament LED depending on the embodiment. LED 100 may include LED chip 102A, LED chip 102B, LED chip 102C, LED chip 102D, casing 104, anode terminal 106, and cathode terminal 108.

LED chips 102A-102D of LED 100 may be solid-state semiconductor devices configured to convert electricity into specific wavelengths of light. LED chips 102A-102D may be made of any of a number of semiconductor materials including gallium arsenide, aluminum gallium arsenide, gallium arsenide phosphide, aluminum gallium indium phosphide, gallium (III) phosphide, aluminum gallium phosphide, indium gallium nitride, gallium (III) nitride, zinc selenide, silicon carbide, silicon, diamond, boron nitride, aluminum nitride, aluminum gallium nitride, aluminum gallium indium nitride, gallium indium nitride, and the like. Such semiconductor materials may be used alone, or in combination.

In some instances, more or less than four LED chips may be used (LED chips 102A-102D are shown for illustrative purposes), so long as the output of such chips is limited to three or less ambient white light settings and one or more bug deterrent settings, as described further below. In these instances, the semiconductor materials may be coated and/or wrapped in phosphor or plastic to produce additional wavelengths/colors of light. In some instances, other types of materials may be used.

Depending on the types of semiconductor materials of LED chips 102A-102D, the chips may be configured to emit wavelengths of light corresponding to ambient colors, which may be limited to three settings of warm white (e.g., low, medium, and high), and one or more bug deterrent settings, which may, e.g., include a wavelength of light configured to deter bugs (e.g., corresponding to orange, yellow, or pink). For example, in some instances, different bug deterrent colors may be more conducive to a particular setting/ambiance, make food more appetizing in the given situation, and/or otherwise. Accordingly, in these instances, multiple different bug deterrent settings may be supported. In other instances, however, a single bug deterrent color may be supported (e.g., so as to limit the options available to a user so as to control ambiance in a public setting, or the like). Accordingly, LED chip 102A may be made of a first material and may be configured to emit a first wavelength of light, LED chip 102B may be made of a second material different than the first material and may be configured to emit a second wavelength of light different than the first wavelength of light, and so on. For example, LED chip 102A may be made of gallium arsenide, aluminum gallium arsenide, gallium arsenide phosphide, aluminum gallium indium phosphide, gallium (III) phosphide, aluminum gallium phosphide, indium gallium nitride, gallium (III) nitride, zinc selenide, silicon carbide, silicon, diamond, boron nitride, aluminum nitride, aluminum gallium nitride, aluminum gallium indium nitride, gallium indium nitride, and the like. In these instances, the LED chip 102A may be configured to output a first wavelength of light between 400 and 700 nanometers (nm), which may, e.g., be combined with the output of one or more additional wavelengths (e.g., outputs from other LED chips, such as LED chips 102B-102D, that may be between 400 and 700 nm, or the like) to produce a visual effect of warm white (which, itself, might not be defined by a single wavelength). As another example, LED chip 102B may be made of gallium arsenide phosphide and may be configured to emit orange light (which is definable by a single wavelength). For example, the LED chip 102B may be made of a particular material known to produce a wavelength of a color known to be a bug deterrent (or otherwise not to attract such bugs). Specifically, the LED 100 may be configured to produce, as the bug deterrent setting, one of: ambient orange, ambient pink, or ambient yellow. In producing the ambient orange, the LED chip 102B may be configured to output a wavelength in the range of 585 to 620 nm. In producing the ambient yellow, the LED chip 102B may be configured to output a wavelength in the range of 570-585 nm. In producing the ambient pink, the LED chip 102B may be configured to output a particular wavelength that may be combined with other wavelengths (e.g., from additional LED chips) so as to produce a visual effect of the ambient pink (which, itself, might not be defined by a single wavelength).

LED chips 102A-102D may be connected in series with a same polarity and may be configured to emit light simultaneously (e.g., one or more of LED chips 102A-102D are activated and/or powered on and emitting light at the same time). In doing so, the ambient white settings and/or a pink bug deterrent setting may be emitted (e.g., using multiple wavelengths produced by multiple LED chips). Similarly, the same wavelength may be produced by one or more of the LED chips 102A-102D so as to produce one of the bug deterrent settings such as orange or yellow. In some instances, the LED chips 102A-102D may be connected in series with opposite polarity, so as to emit light in the alternate (e.g., when LED chip 102A is activated and/or powered on and emitting light, LED chip 102B is not activated and/or powered on and not emitting light). In some instances, the LED chips 102A-102D may be connected in series through a combination of the same polarity and an opposite polarity (e.g., so as to activate a first plurality of LED chips to produce the ambient warm white setting, and a second plurality of LED chips (or a single LED chips depending on the desired bug deterrent color) to produce the bug deterrent setting).

In instances where additional LED chips 102 are included in LED 100, each LED chip of a plurality of additional LED chips may be connected in series with the same polarity and may be configured to emit light simultaneously (e.g., all LED chips of the plurality of LED chips in LED 100 are activated and/or powered on and emitting light at the same time). Alternatively, each LED chip of a plurality of additional LED chips may be connected in series with alternating polarity and may be configured to emit light in the alternate (e.g., every other LED chip of the plurality of LED chips in LED 100 are activated and/or powered on and emitting light). Furthermore, the plurality of LED chips may be grouped in alternating like-polarity increments and may be configured to emit light in the group alternate (e.g., every other group of two LED chips of the plurality of LED chips in LED 100 are activated and/or powered on and configured to emit light at the same time).

LED chips 102A-102D may be attached to casing 104. Casing 104 may be made of any one, or combination of, metals, polymers, ceramics, and/or composites. In some embodiments, casing 104 may encapsulate LED chips 102A-102D. In such embodiments, casing 104 may be waterproof and/or otherwise weatherproof (e.g., to withstand outdoor use). Furthermore, casing 104 may be colored and, as such, may be configured to alter the end light emission spectrum. In other embodiments, casing 104 may be a surface to which LED chips 102A-102D are attached and may not encapsulate the chips.

In some instances, the LED chips 102A-102D may be associated with lighting chip controls, which may, for example, include one or more LED chips (e.g., LED chips 102A-102D, or the like) configured to emit ambient white light, and one or more LED chips configured to emit a bug deterrent light, such as orange, yellow, or pink. In some instances, the ambient white light may be produced by one or more first LEDs and the bug deterrent light may be produced by one or more second LEDs, different than the first LEDs.

LED 100 may be a polarized component and may include anode terminal 106 and cathode terminal 108. Anode terminal 106 may be alternatively identified as a positive terminal and may be configured to receive a positive voltage input. Cathode terminal 108 may be alternatively identified as a negative terminal and may be configured to receive a negative voltage input. However, in certain embodiments, terminals 106 and 108 may be identified as a first terminal and a second terminal, respectively, and may be configured to receive either a positive or negative voltage input.

Figure 2:
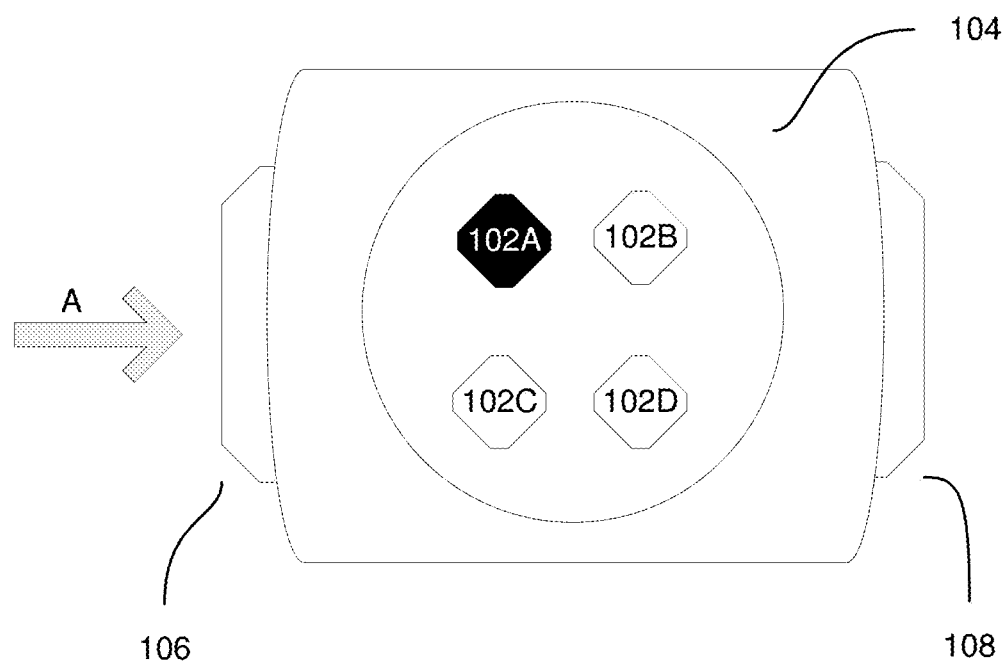
FIG. 2 is a diagram illustrating a first example of power flow and corresponding LED chip activation according to one or more aspects of the disclosure.

As shown in FIG. 2, one or more of LED chips 102A-102D may be configured to activate and/or power on and emit a wavelength of light when power flow A enters LED 100 through first terminal 106 (e.g., as is illustrated in FIG. 2 with regard to the LED chip 102A). Conversely, one or more of LED chips 102A-102D might not be configured to activate and/or power on under such a direction of power flow (e.g., as is illustrated in FIG. 2 with regard to the LED chips 102B-102D). In some embodiments, all of LED chips 102A-102D may be configured to activate and/or power on when power flow A enters LED 100 through first terminal 106. In some instances, one or more terminals (e.g., first terminal 106, second terminal 108, or the like) may be implemented on the LED 100.

Figure 3:
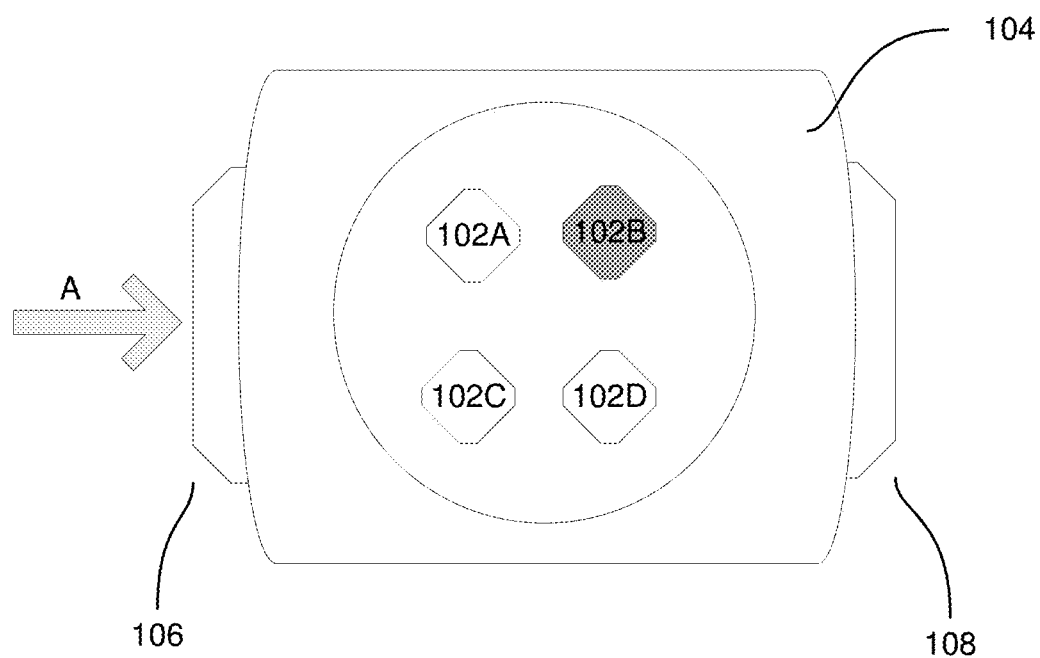
FIG. 3 is a diagram illustrating a second example of power flow and corresponding LED activation according to one or more aspects of the disclosure.

As shown in FIG. 3, LED chip 102B may be configured to activate and/or power on and emit a second wavelength of light different than the first wavelength as discussed above. In some instances, the power flow A may enter the LED 100 through the first terminal 106 as described above with regard to FIG. 2. Additionally or alternatively, the power flow A may enter LED 100 through a different terminal (e.g., second terminal 108). In some instances, any of LED chips 102A-102D may be configured to activate and/or power on under any such directions of power flow. In some instances, each LED chip 102A-102D may be configured to emit a single wavelength (e.g., corresponding to yellow, orange, or the like), though in some instances, the emissions of multiple LED chips may be combined to produce a particular visual effect (e.g., warm white, pink, or the like), as described further below.

Figure 4:
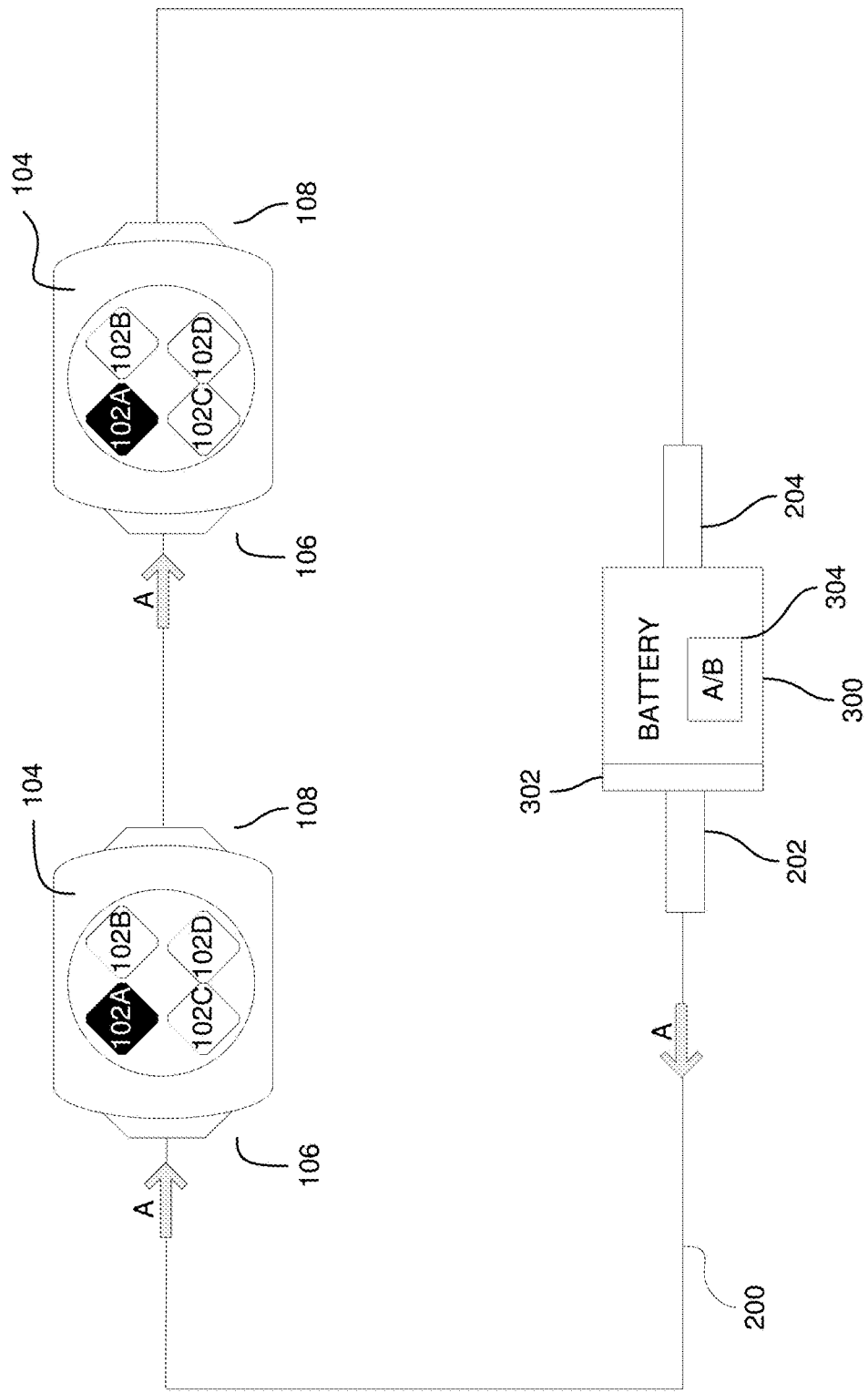
FIG. 4 is a diagram illustrating an example of power flow and corresponding LED chip activation in an LED system according to one or more aspects of the disclosure.

FIG. 4 illustrates an LED system 400 according to one or more embodiments of the present disclosure. LED system 400 may include one or more LEDs 100, each of which may include the above-mentioned components (e.g., at least LED chips 102A-102D, casing 104, at least first terminal 106 and second terminal 108), wire 200, and battery 300.

Each of the one or more LEDs 100 may be connected in series to each other via wire 200. The first and last LEDs 100 of the series of LEDs may be connected to battery 300 via wire 200. Wire 200 may be a wire, string, and/or cable and may be comprised of any of a plurality of conductive materials including, but not limited to, copper and aluminum. Wire 200 may be an insulated wire or may be an uninsulated wire depending on the embodiment. Furthermore, wire 200 may be a rigid, semi-rigid, or flexible wire allowing for pliability, or lack thereof.

In certain embodiments, wire 200 may contain a first terminal end 202 and a second terminal end 204. The first terminal end 202 and second terminal end 204 may be configured to be plugged and/or unplugged from a power output portion 302 of battery 300. Accordingly, the polarity of wire 200 may be reversible by interchanging the connection of the first terminal end 202 and second terminal end 204 with a power output portion 302 of battery 300. In certain embodiments, the first terminal end 202 may be known as a first inline connector, and the second terminal end 204 may be known as a second inline connector.

Battery 300 may be configured so as to provide electrical energy to the one or more LEDs 100 of LED system 400. In some instances, battery 300 may include one or more exhaustible batteries, one or more rechargeable batteries (e.g., 18650 Lithium Ion batteries or other suitable rechargeable batteries), or the like. In some instances, the battery 300 may be connected, e.g., via a connector and/or a uniform serial bus (USB) connection, indirectly to an AC power source via a power transformer (not shown). The power transformer may be integral with battery 300 or may be an ancillary adapter. The power transformer may be able to translate energy into a form acceptable by the one or more LEDs 100. Such energy sources and/or translation methods may be used alone, or in combination. By configuring the LED system 400 in this way, USB charging may be enabled to power the one or more LEDs 100, thus creating a self-contained and portable LED system 400. Although USB charging is described, any other method of battery charging may be implemented without departing from the scope of the disclosure (e.g., wireless charging, power outlet, and/or otherwise).

As stated above, the battery 300 may be configured to engage and/or disengage with the first terminal end 202 and the second terminal end 204 of wire 200. Accordingly, battery 300 may be configured to output power through either the first or second terminal end depending on the orientation of engagement/polarity of the terminal ends of wire 200 relative to a power output portion 302 of battery 300. For example, in instances where the first terminal end 202 of wire 200 is engaged with the power output portion 302 of battery 300, power flow A may flow through the first terminal end 202. Alternatively, in instances where the second terminal end 204 of wire 200 is engaged with the power output portion 302 of battery 300, power flow A may flow through the second terminal end 204. In such instances, power output portion 302 may be a fixed and/or static power output portion.

In certain embodiments, battery 300 may further include A/B switch 304 which can be used to reorient power output portion 302 and reverse the direction of power flow A into wire 200 from the first terminal end 202 to the second terminal end 204 or vice versa. In such embodiments where battery 300 includes A/B switch 304, the first and second terminal ends of wire 200 may be rigidly attached to the battery 300 and power output portion 302 may be an alterable and/or dynamic power output portion. However, the first terminal end 202 and second terminal end 204 of wire 200 may be configured to engage and/or disengage with battery 300 in addition to the presence of A/B switch 304. In some instances, the A/B switch 304 may be otherwise configured to route the power to lighting chip controls (e.g., a particular LED chip or group of LED chips of the LED chips 102A-102D) so as to activate such controls/LED chips. In some instances, such light chip controls may cause one or more LEDs (e.g., LED 100, or the like) to emit light corresponding to a maximum of four discrete settings limited to ambient white light and an insect deterrence light.

Depending on the direction of power flow A from power terminal 300, one or more LED chips comprised within the one more or more LEDs 100 may activate and/or power on and emit light. For example, as shown in FIG. 4, when power flow A enters the first terminal 106 of one or more LEDs 100, one or more lighting chip controls (e.g., one or more LED chips 102A-102D) may activate and/or power on and emit light of a first wavelength (e.g., orange or yellow) or combination of wavelengths (to produce pink). Similarly, when the power flow is adjusted using the A/B switch 304, a different grouping of the one or more lighting chip controls (e.g., one or more LED chips 102A-102D) may activate and/or power on to emit light of a combination of wavelengths (to produce ambient white). For example, the A/B switch 304 may be configured to transition between the discrete ambient white light settings and the one or more bug deterrent settings. In some instances, a first setting of the one or more lighting chip controls (e.g., a first set of the one or more LED chips (e.g., LED chips 102A and 102B)) may be configured to produce the bug deterrent setting and a second setting of the one or more lighting chip controls (e.g., a second set of the one or more LED chips (e.g., LED chips 102C and 102D)) may be configured to produce the ambient warm white settings. In certain embodiments, the LED chips 102A of each of the plurality of LEDs 100 may exhibit any of a limited range of wavelength profiles (e.g., warm white profiles such as low, medium, high, or bug deterrent profiles such as orange, yellow, or pink, etc.). The LEDs 100 may be limited to such profiles so as to produce ambient light in a non-disruptive manner. In some instances, the warm white profiles may each correspond to the same LED output (e.g., the same wavelengths produced by the same LED chips) and the bug deterrent profile may correspond to one or more different wavelengths. For example, the warm white profiles of low, medium, and high may be achieved by varying a resistance (e.g., as described further below) corresponding to the LED system 400 rather than varying the output wavelengths. Accordingly, the LEDs 100 may, in some instances, be limited to the output of two different wavelength profiles. Furthermore, the wavelengths associated with the bug deterrent profiles may be colors known to not attract (and/or otherwise deter) bugs or other insects, while complying with the non-disruptive nature of the otherwise ambient light intended to be produced by the LEDs 100. The pattern of wavelength profiles for the LED chips 102A-102D of each of the LEDs 100 connected in the series of LEDs may be homogeneous (e.g., orange, orange, orange, orange, etc.) rather than heterogeneous (which may, e.g., produce a more disruptive appearance). Although two LEDs 100 are illustrated, any number of such LEDs may be included in the LED system 400 without departing from the scope of the disclosure.

While not explicitly shown in FIG. 4, A/B switch 304 may include a timer. The timer of A/B switch 304 may be any one of a mechanical, electrical, or electromechanical timer and may be configured to turn on/off at a specified time for a specified time interval (e.g., turn on at 6 PM, turn off at midnight, etc.). The time and time interval may be specified by a user, or may be predetermined. In some instances, multiple times and time intervals may be set.

In certain embodiments, the timer may be configured to terminate power flow A from battery 300 to wire 200 during either the on or off period. For example, the timer may be set by a user and/or may be predetermined to turn off for a twelve hour period starting at 12 AM (e.g., a period of time during which a restaurant or other user of the LED system 400 is closed or otherwise not using the system). During the time period in which the timer is off (e.g., 12 AM to 12 PM), the timer may be configured to inhibit power flow A from battery 300 to wire 200, and thereby prevent light emission from the one or more LEDs 100. Conversely, during the time period from 12 PM-12 AM in which the timer is on, the timer may be configured to allow power flow A from battery 300 to wire 200, and thereby allow light emission from the one or more LEDs 100.

In other embodiments, the timer, in conjunction with A/B switch 304, may be configured to adjust power flow so as to activate different LED chips and to produce different outputs at different times of day (e.g., increase light intensity as it gets later), different times of year (e.g., incorporate the bug deterrent setting during seasonal and/or other time periods when bug deterrence may be of higher importance), or the like). In these instances, the timer may be configured to cause A/B switch 304 to orient power output portion 302 in line with the first terminal end 202 or second terminal end 204 and cause power flow A to enter wire 200 through the respective terminal end.

Furthermore, although not explicitly shown, a variable resistance component (such as a potentiometer, or other component) may be located between the power output portion 302 and one or more LED chips (e.g., as part of the wire 200, casing 104, and/or otherwise placed so as to receive the power flow A en route to the lighting chip controls (e.g., LED chips 102A-102D, or the like)). In these instances, varying the resistance of the variable resistance component may enable toggling between a maximum of three ambient warm white light settings. For example, to transition to a setting of higher intensity, the resistance may be decreased. Similarly, to transition to a setting of lower intensity, the resistance may be increased. In these instances, the resistance may be varied based on a controller located within the battery 300, A/B switch 304, and/or otherwise. In some instances, the variable resistance component may be limited to a maximum of three distinct resistance values, thus enabling the output of strictly a maximum of three different discrete ambient warm white light settings and preventing a fully customizable output. In doing so, output of the LEDs 100 may be limited to certain settings so as not to disrupt an ambience of a location in which the LED lamp is located.

In some instances, the variable resistance component may be integrated with the timer or other control mechanism. For example, the timer may be set to turn decrease the resistance provided by the variable resistance component throughout an evening so as to provide higher intensity light as the evening becomes more and more dark, and vice versa.

Figure 5:
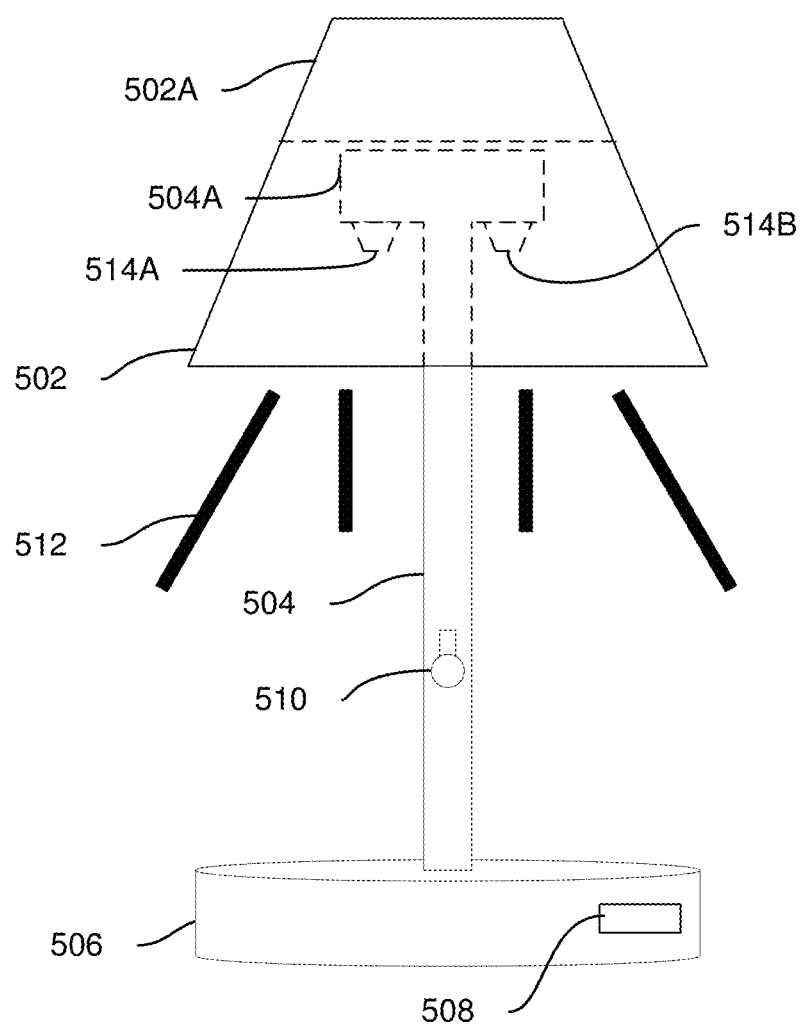
FIG. 5 is a diagram illustrating a first example operation of an LED lamp according to one or more aspects of the disclosure.

FIG. 5 depicts an LED lamp 500 according to one or more aspects of the disclosure. LED lamp 500 may be configured for indoor and/or outdoor use and may be configured to stand upright (e.g., for use on a table, desk, and/or other surface). LED lamp 500 may include one or more LEDs 100, each of which comprising the above-mentioned components (e.g., at least LED chips 102A-102D, casing 104, at least first terminal 106, wire 200, and battery 300. Additionally, each component of LED lamp 500 may have some or all of the structural components described above in regard to LED system 400.

Figure 8:
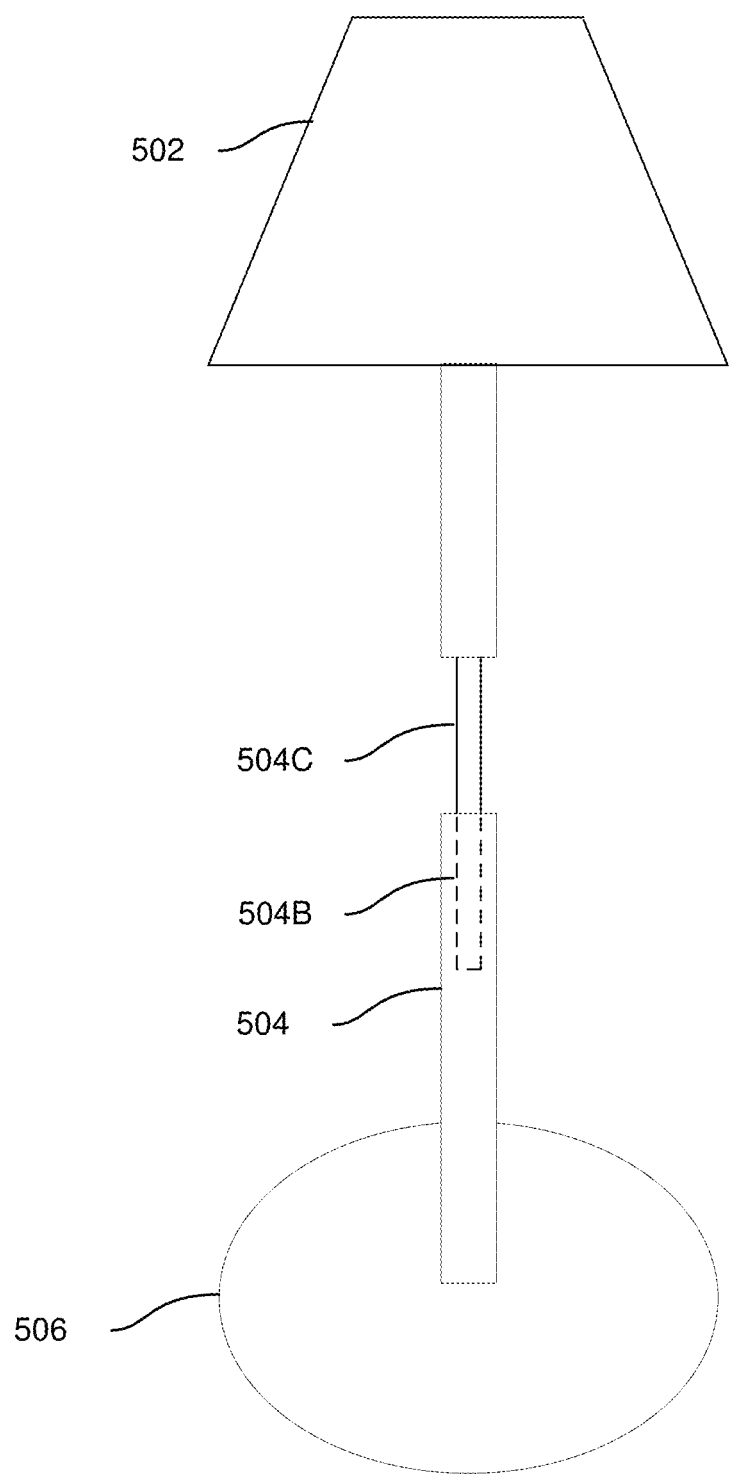
FIG. 8 is a diagram illustrating an extendable support apparatus for an LED lamp according to one or more aspects of the disclosure.

Each of the one or more LEDs 100 may be affixed to a top portion of the support apparatus 504 and/or otherwise integrated into the lamp shade 502 (e.g., so as to enable the emission of light as shown in FIG. 5). Wire 200 may be included within the lamp shade 502, support apparatus 504, and/or base 506. The lamp shade 502, support apparatus 504, and/or base 506 may be made of plastic, metal, or a combination thereof. In some instances, the support apparatus 504 may be a rigid body offering minimal pliability. Alternatively, the support apparatus 504 may be a semi-rigid and/or otherwise flexible structure that may, e.g., allow for positioning and/or orientation of the lamp shade to be easily adjusted. In some instances, the support apparatus 504 may include a height adjustment mechanism (e.g., including a second support apparatus that may recede within the support apparatus 504 and/or extend beyond the support apparatus 504) and/or additional connectable component (e.g., a second support apparatus) that may be connected to the support apparatus 504. In either instances, the second support apparatus may be used to extend and/or otherwise adjust a height of the LED lamp 500 (e.g., from a height of ten inches to a height of thirteen and a half inches, or the like). For example, as is further illustrated in FIG. 8, the support apparatus 504 may include a height adjustment mechanism, which may include a threaded portion 504C of the support apparatus 504 configured to screw into the portion 504B of the support apparatus 504. In some instances, the height adjustment mechanism may configure the support apparatus to extend and/or retract the height of the support apparatus. In some instances, the support apparatus may be extended and/or retracted using other techniques (e.g., without using a threaded extension mechanism, or the like) without departing from the scope of the disclosure.

By limiting the height in this way, the LED lamp 500 may be configured for portable use on various surfaces (e.g., tables, desks, or the like).

The LEDs 100 included within LED lamp 500 may be of a similar type (e.g., miniature, low-current, low-power, high-power, flashing, bi-color, tri-color, etc.) or may be any of a range of types so long as such types support exclusively ambient light settings (e.g., limited to various intensities of warm white) and bug deterrent settings (e.g., ambient orange, yellow, pink, and/or other bug deterrent colors).

While not explicitly shown in FIG. 5, LED chips 102A-102D may be included in the one or more LEDs 100. The LED chips of the one or more LEDs 100 may be configured to activate and/or power on when power flow A traverses wire 200. For example, when power flow A enters the first terminal end 202 of wire 200 and flows through the first terminal of each of the one or more LEDs 100, one or more of LED chips 102A-102D may activate and/or power on (e.g., as described above), thus causing light 512 to be emitted from the LED lamp 500. Furthermore, although not explicitly shown in FIG. 5, battery 300 may be integrated into the lamp shade 502, support apparatus 504, base 506, and/or other component of the LED lamp 500. Similarly, a charging port (e.g., USB charging port, and/or other port), such as charging port 508, may be integrated into the lamp shade 502, support apparatus 504, base 506, and/or other component of the LED lamp 500, which may, e.g., enable charging of the battery 300. In some instances, a switch, such as switch 510 (which may, e.g., correspond to and/or otherwise control the A/B switch 304) may be incorporated into the lamp shade 502, support apparatus 504, base 506, and/or other component of the LED lamp 500, which may, e.g., enable toggling between the discrete light settings supported by the LED lamp 500.

Figure 9:
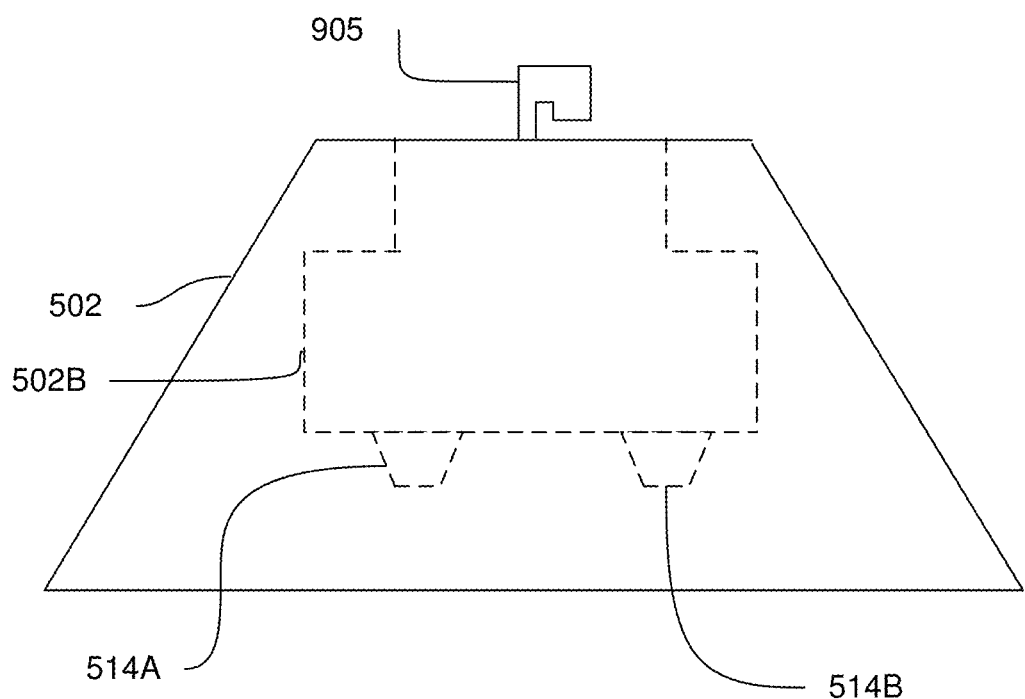
FIG. 9 is a diagram illustrating a self-contained lamp shade for an LED lamp according to one or more aspects of the disclosure.

Although not depicted, the lamp shade 502 may, in some instances, include a hook that may configure the LED lamp 500 to be hung. In some instances, the lamp shade 502 may be self-contained, and configured for use without the support apparatus 504 and/or base 506. For example, the LED system 400 may be entirely contained within the lamp shade 502. In these instances, the lamp shade 502 may be hung independently of the remaining components of the LED lamp 500 (e.g., using the hook), and may emit light as described herein. For example, the LED system 400 may be contained within the lamp shade 502, as is illustrated in FIG. 9. For example, the lamp shade 502 may be configured with a shade portion 502B to which the LEDs 514A and 514B may be attached. Accordingly, the LED lamp 500 may, in some instances, be hung while emitting light, and/or may be placed on a surface such as a desk, table, and/or otherwise while emitting light. For example, the lamp shade 502 may include a hooking mechanism (e.g., hooking mechanism 905), which may, e.g., enable hanging of the self-contained lamp shade 502. In these instances, the charging port (e.g., charging port 508) and/or the switch (e.g., switch 510) may be included within the lamp shade 502 so as to enable independent operation of the lamp shade without the support apparatus 504 and/or base 506. In some instances, the lamp shade 502 may be configured to be stacked on top of another lamp shade 502 and/or otherwise attached to the support apparatus 504. In some instances, the LED lamp 500 may be configured for both indoor and outdoor use, and may be designed in a number of different colors.

As illustrated in FIG. 5, in some instances, a shade portion 502A of the shade 502 may be configured to rest on top of a support apparatus portion 504A of the support apparatus 504. In these instances, the LEDS 514A and 514B may be attached to the support apparatus portion 504A.

Figure 6:
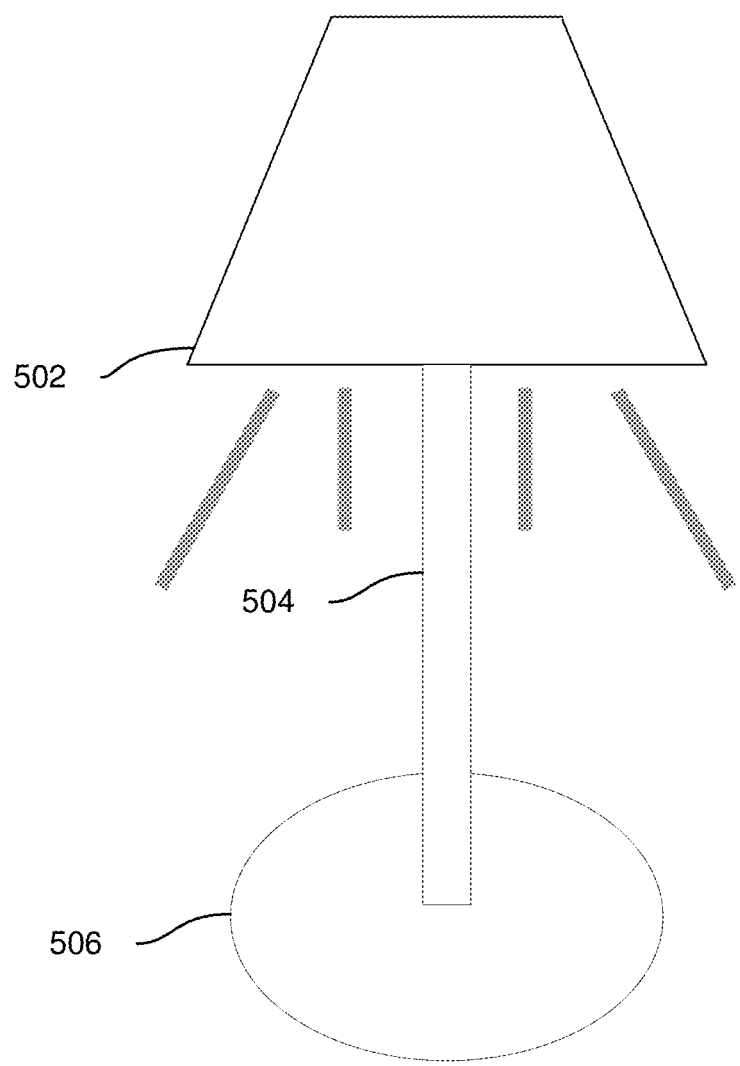
FIG. 6 is a diagram illustrating a second example operation of an LED lamp according to one or more aspects of the disclosure.
Figure 7:
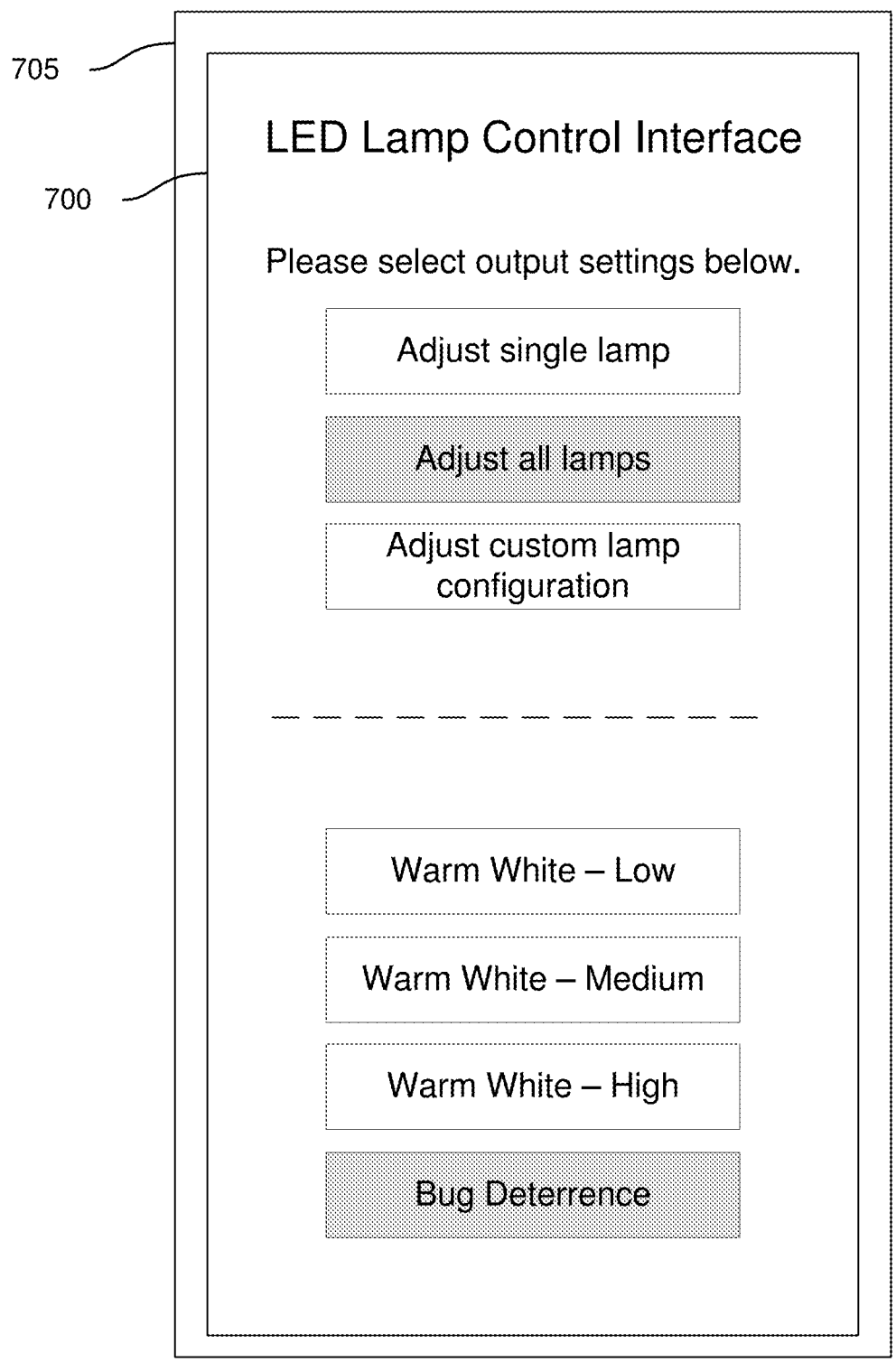
FIG. 7 is a diagram illustrating an example graphical user interface for controlling an LED lamp according to one or more aspects of the disclosure.

As shown in FIG. 6, a wavelength of the light emitted by the LED lamp 500 may be adjusted. For example, the wavelength of the light may be adjusted from a wavelength emitted by LED chip 102A (e.g., as shown in FIG. 2) to a second wavelength emitted by LED chip 102B (e.g., as shown in FIG. 3), and/or an adjustment of different wavelengths emitted by various groups of LED chips within the various LEDs 100. In some instances, this transition may be initiated based on the timer (e.g., as described above with regard to the A/B switch 304), based on a manual adjustment of the LED lamp 500 (e.g., adjusting a dial, switch, and/or other input mechanism on the LED lamp 500), based on receiving a wireless input (e.g., via a mobile application at a mobile device and/or other remote controller configured to transmit a wireless communication to a receiver of the LED lamp 500), and/or otherwise. For example, a mobile device 705 (which may, e.g., be a smartphone, tablet, desktop computer, laptop computer, and/or other device) may be configured to communicate with a circuitry on the LED lamp 500 corresponding to the switch 510 and/or A/B switch 304, and to display a graphical user interface similar to graphical user interface 700, as shown in FIG. 7. In instances where a wireless input is transmitted to adjust the output of the LED lamp 500, this wireless transmission may be sent to a plurality of LED lamps (e.g., similar to the LED lamp 500), which may, e.g., cause each of the plurality of LED lamps to simultaneously adjust their output (e.g., in terms of wavelength and/or resistance). For example, the transmission may be customized to adjust all connected LED lamps, a single LED lamp, and/or a customized subset of the connected LED lamps. The wavelength of light output by the LED lamp 500 may be toggled between a plurality of ambient light settings (e.g., limited to three or less settings (e.g., different intensities) of warm white) and one or more bug deterrent settings (e.g., a wavelength corresponding to an ambient orange, yellow, or pink setting).

Accordingly, a self-contained and portable LED lamp with variable light settings is described herein. For example, the LED lamp may be limited to four or less light settings. In doing so, the LED lamp may prevent the emission of light that may disturb an ambiance of a location in which the LED lamp is located (e.g., such as a dimly lit restaurant, or the like). For example, a maximum of three the light settings may be directed to warm white ambient light settings (e.g., low, medium, high). Additionally, one or more settings may be directed to an ambient color known to either deter and/or otherwise not attract insects (e.g., orange, yellow, pink, and/or other colors known to be a bug deterrent). In doing so, the LED lamp may provide bug deterrent capabilities without disrupting the above described ambience. By providing charging and/or other battery powered capabilities, the LED lamp may be self-contained and portable, thus eliminating a need to maintain a wired connection between the LED lamp and a power outlet during use. The LED lamp may be configured with height adjustment capabilities, as well as a hook enabling the LED lamp to be hung. Additionally, materials used to construct the LED lamp may configure the LED lamp for both indoor and outdoor use.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An insect deterrent lamp comprising:
   a battery electrically coupled to a light-emitting diode (LED) and configured to produce power;
   the LED connected to the battery, wherein the LED includes:
      lighting chip controls, wherein the lighting chip controls cause the LED to emit light corresponding to one or more of: ambient white light or an insect deterrence light, wherein light emission of the LED is limited to:
         a maximum of three ambient white light settings, and
         one or more insect deterrence settings; and
      a switch configured to transition between the maximum of three ambient white light settings and the one or more insect deterrence settings.

2. The insect deterrence lamp of claim 1, wherein the lighting chip controls comprise one or more LED chips configured to emit the maximum of three ambient white light settings and the one or more insect deterrence settings.

3. The insect deterrence lamp of claim 1, wherein emitting the ambient white light comprises emitting a first wavelength, wherein the first wavelength is within a range of 400-700 nanometers.

4. The insect deterrence lamp of claim 3, wherein the LED uses multiple LED chips to output different wavelengths within the range of 400-700 nanometers, and wherein a combination of the first wavelength and the different wavelengths creates the ambient white light.

5. The insect deterrence lamp of claim 1, wherein emitting the insect deterrent light comprises emitting a second wavelength, wherein the second wavelength corresponds to a color to which insects are not attracted or from which the insects are deterred.

6. The insect deterrence lamp of claim 5, wherein the second wavelength is within a range of 585-620 nanometers, wherein the one or more insect deterrence settings comprises an ambient orange light.

7. The insect deterrence lamp of claim 5, wherein the second wavelength is within a range of 570-585, wherein the one or more insect deterrence settings comprises an ambient yellow light.

8. The insect deterrence lamp of claim 5, wherein the LED is configured to output different wavelengths in addition to the second wavelength, and wherein a combination of the second wavelength and the different wavelengths creates an ambient pink light, wherein the one or more insect deterrence settings comprises the ambient pink light.

9. The insect deterrence lamp of claim 1, wherein the switch is configured to modify output of the LED to a different intensity of the ambient white light, and wherein the LED is configured to output a maximum of three intensities of the ambient white light, each corresponding to one of the maximum of three ambient light settings.

10. The insect deterrence lamp of claim 1, further comprising a connector connected to the battery enabling the battery to be charged by a uniform serial bus (USB) connection.

11. The insect deterrence lamp of claim 1, wherein the insect deterrence lamp comprises a shade, a base, and a support, wherein the support is configured to connect the shade to the base.

12. The insect deterrence lamp of claim 11, wherein the battery, the LED, and the switch are configured within the shade, and wherein the shade is configured for operation without the base and the support.

13. The insect deterrence lamp of claim 11, wherein the shade includes a hook mechanism, configuring the shade to be hung using the hook mechanism.

14. The insect deterrence lamp of claim 11, wherein the support comprises a height adjustment mechanism, wherein the height adjustment mechanism configures a height of the insect deterrence lamp to vary between 10 inches and 13.5 inches.

15. The insect deterrence lamp of claim 1, wherein the LED is configured to switch between the maximum of three ambient white light settings and the one or more insect deterrence settings in response to a control signal from a mobile application.

16. The insect deterrence lamp of claim 1, wherein the LED is configured to switch between the maximum of three ambient white light settings and the one or more insect deterrence settings in response to a manual input received at the insect deterrence lamp.

17. An insect deterrent lamp comprising:
   a battery electrically coupled to at least one light emitting diode (LED) and configured to produce power;
   the at least one LED connected to the battery, wherein the LED includes:
      lighting chip controls, wherein the lighting chip controls are configured to emit light in a plurality of settings, wherein the plurality of settings is limited to:
         a maximum of three ambient white light settings, and
         one or more insect deterrence light settings; and
      a switch connected to the at least one LED, wherein the switch is configured toggle between the plurality of settings.

18. The insect deterrent lamp of claim 17, wherein:
   a first white light setting of the maximum of three ambient white light settings corresponds to emission of a plurality of wavelengths within a range of 400-700 nanometers corresponding to a first intensity of ambient white light; and
   a second white light setting of the maximum of three ambient white light settings corresponds to emission of the plurality of wavelengths within the range of 400-700 nanometers corresponding to a second intensity of ambient white light, wherein the second intensity is less than the first intensity, and wherein initiating the second white light setting comprises increasing a resistance between the battery and the lighting chip controls using a variable resistance component.

19. The insect deterrent lamp of claim 17, wherein:
the maximum of three ambient white light settings are emitted by a first LED,
the one or more insect deterrence light settings are emitted by a second LED, and
the one or more insect deterrence light settings comprise emission of one of: orange light, pink light, or yellow light.

20. A self-contained and portable light-emitting diode (LED) device, comprising:
a base,
an extendable support apparatus, and
a shade, wherein the shade includes:
one or more LEDs configured to toggle between four or less light settings, and wherein the four or less light settings include:
one or more of: a first ambient white light setting, a second ambient white light setting, or a third ambient white light setting, wherein:
the second ambient white light setting has a higher intensity that the first ambient white light setting, and
the third ambient white light setting has a higher intensity than the second ambient white light setting; and
one or more insect deterrent settings corresponding to one or more of: an ambient orange light, an ambient yellow light, or an ambient pink light; and
a battery, wherein the one or more LEDs are powered exclusively by the battery, and wherein the battery configures the one or more LEDs for operation in the absence of a hardware connection to a separate power source.

\* \* \* \* \*